US012536002B2

(12) United States Patent
Wang et al.

(10) Patent No.: US 12,536,002 B2
(45) Date of Patent: Jan. 27, 2026

(54) DEFINING AND USING REUSABLE MODULES TO GENERATE FORM CONTROL CODE

(71) Applicant: Oracle International Corporation, Redwood Shores, CA (US)

(72) Inventors: Haiyan Wang, Parker, CO (US); Qiu Zhong, Mercer Island, WA (US)

(73) Assignee: Oracle International Corporation, Redwood Shores, CA (US)

( * ) Notice: Subject to any disclaimer, the term of this patent is extended or adjusted under 35 U.S.C. 154(b) by 313 days.

(21) Appl. No.: 18/477,330

(22) Filed: Sep. 28, 2023

(65) Prior Publication Data

US 2025/0110713 A1 Apr. 3, 2025

(51) Int. Cl.
*G06F 8/36* (2018.01)
(52) U.S. Cl.
CPC .................................... *G06F 8/36* (2013.01)
(58) Field of Classification Search
None
See application file for complete search history.

(56) References Cited

U.S. PATENT DOCUMENTS

| 7,051,273 B1 * | 5/2006 | Holt | G06Q 10/107 |
| | | | 715/226 |
| 2005/0182742 A1 * | 8/2005 | Griffin | G06F 16/954 |
| 2006/0224948 A1 * | 10/2006 | Desmond | G06F 40/174 |
| | | | 707/999.107 |
| 2012/0311423 A1 * | 12/2012 | Hodes | G06F 40/174 |
| | | | 715/221 |
| 2013/0198595 A1 * | 8/2013 | Waldman | G06F 40/174 |
| | | | 715/205 |
| 2014/0310582 A1 * | 10/2014 | Bardman | G06F 40/174 |
| | | | 715/222 |
| 2020/0257506 A1 * | 8/2020 | Yoshiyama | G06F 3/04845 |
| 2023/0289148 A1 * | 9/2023 | Wang | G06F 8/34 |
| 2025/0110713 A1 * | 4/2025 | Wang | G06F 8/36 |

OTHER PUBLICATIONS

Restrepo, "From Function to Context to Form: Precedents and Focus Shifts in the Form Creation Process", 2005, ACM (Year: 2005).*

* cited by examiner

*Primary Examiner* — Hossain M Morshed
(74) *Attorney, Agent, or Firm* — Invoke

(57) ABSTRACT

Techniques for defining and using reusable modules to generate form control code are disclosed, including: displaying a form control implementation interface for applying form control functions to forms; receiving via the form control implementation interface: a first user input selecting a form control function of the form control functions; a second user input selecting one or more input parameters, for the form control function, that are to be extracted from the target form; a third user input selecting a target field of a target form, one or more attributes of the target field to be modified via execution of the form control function; generating form control code that extracts the one or more input parameters from form data received for the target form and applies the form control function to the one or more input parameters to modify the one or more attributes of the target field.

20 Claims, 17 Drawing Sheets

Job Master Revisions

✓ X ꟼ Form ⚙ Tools

| Job Number * |  |

| Revise Single Job | More Detail | Cat Codes 1-20 | Cat Codes 21-40 | Cat Codes 41-50/AB No | Dates/Other |

Description
Project
Company *
Type Business Unit
Joint Venture Parent Business Unit
Subledger Inactive
Model Job
Level of Detail
Threshold % Complete

| Job Number * | [        ] |

⊗ Revise Single Job | More Detail | Cat Codes 1-20 | Cat Codes 21-40 | Cat Codes 41-50/AB No | Dates/Other Description          [r                    ]
Project              [R  ]
504 — Company *            [        ]
506 — Type Business Unit   [JB] Job Cost
Joint Venture Parent Business Unit  [        ]
Subledger Inactive   [ ]
Model Job            [ ]
Level of Detail      [9] Level of detail
Threshold % Complete [ ]

```
                        ⌂ ⓘ ▦ ᐃ ☆ ▷ ♛
Job Master Revisions
 ✓  X ℟ Form ⚙ Tools
▼ This form has 2 Errors 0 Warnings
Issues (click each label for more information):
  ▷        Blanks Invalid ▷
  ▷        Business Unit Invalid ▷
Please look for the highlighted fields or use Go To Error links to move the focus to the control
with the error, correct the entries, and resubmit your request.

Job Number *  [          ]

⊛Revise Single Job │ More Detail │ Cat Codes 1-20 │ Cat Codes 21-40 │ Cat Codes 41-50/AB No │ Dates/Other Description          [                    ]
    Project              [ R    ]
    Company *            [////////////////////]
                         [ JB ]  Job Cost
    Subledger Inactive   [    ]
    Model Job            [    ]
    Level of Detail      [ 9  ]  Level of detail
    Threshold % Complete [    ]
```

510 points to the "Issues" / errors block.
504 points to the Company * row.

FIG. 5B

DEFINING AND USING REUSABLE MODULES TO GENERATE FORM CONTROL CODE

TECHNICAL FIELD

The present disclosure relates to the generation of form control code using reusable modules.

BACKGROUND

Software applications commonly manage a user interface by executing various control functions. The form control functions execute operations on fields within a form. The operations may include, for example: show field; hide field; enable field; disable a push button; highlight the input field with a specific color; change a label; etc. Typically, the form control functions are statically defined in source code, which must be written by a programmer on a case-by-case basis. Accordingly, modifying form control functions involves rewriting the source code and recompiling the source code to generate an updated version of a software application that performs form control functions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 4A-4D illustrate a control function implementation interface in accordance with one or more embodiments;

FIGS. 5A-5B illustrate a control function execution interface in accordance with one or more embodiments;

DETAILED DESCRIPTION

Figure 1:
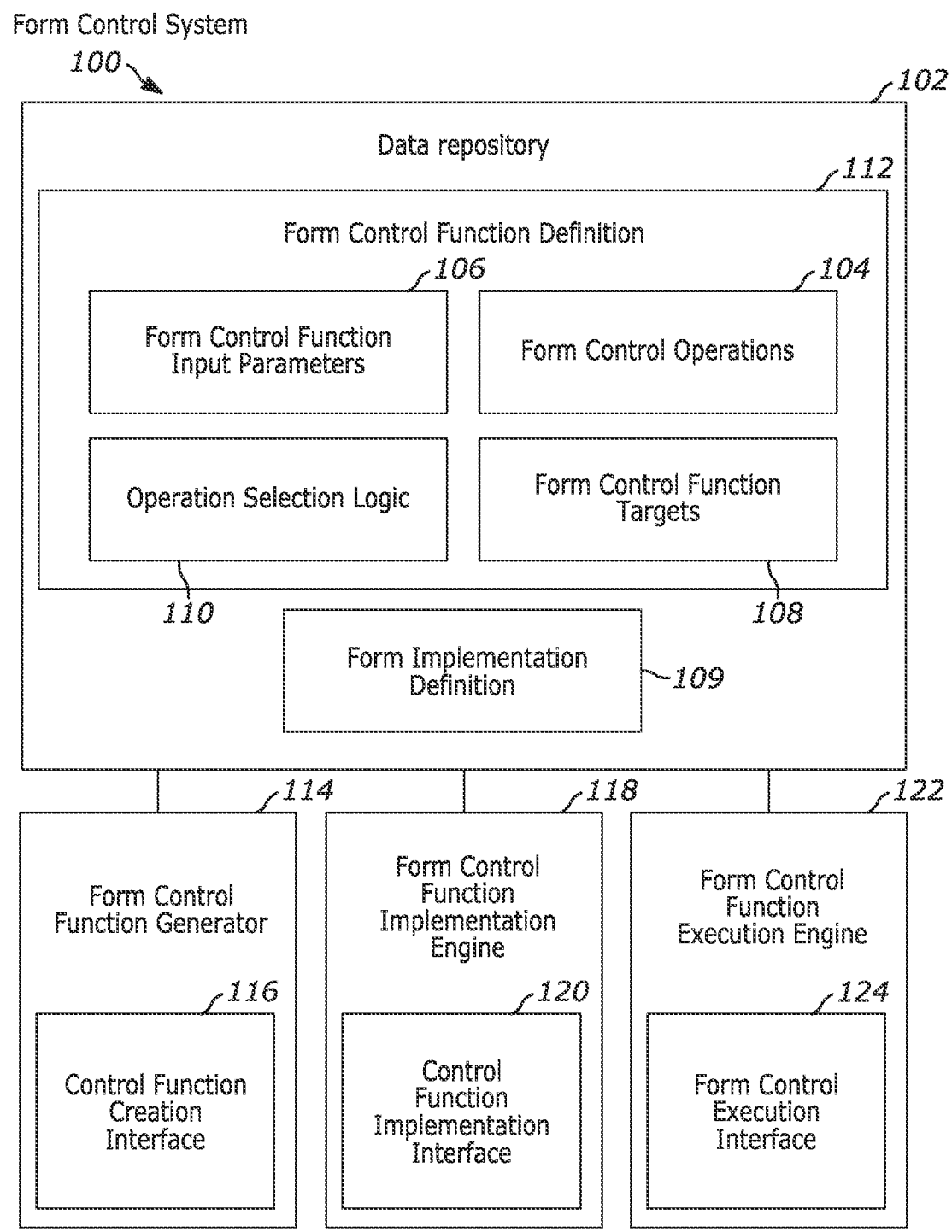
FIG. 1 illustrates a form control system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. FORM CONTROL SYSTEM
3. GENERATING A FORM CONTROL FUNCTION
4. IMPLEMENTING A PREVIOUSLY CREATED FORM CONTROL FUNCTION FOR A PARTICULAR FORM
5. EXECUTING THE FORM CONTROL FUNCTION FOR THE PARTICULAR FORM
6. CONTROL FUNCTION CREATION INTERFACE
7. CONTROL FUNCTION IMPLEMENTATION INTERFACE
8. FORM CONTROL EXECUTION INTERFACE
9. HARDWARE OVERVIEW

1. General Overview

One or more embodiments use predefined form control functions to generate form control code that modifies attributes of form fields. The use of predefined form control functions by a system to generate form control code improves the speed and accuracy with which form control code may be generated. Predefined form control functions may also improve system performance by reducing the incidence of programming errors, because form control functions do not need to be written from scratch for each individual form. The system includes a form control function generator to generate form control functions, a form control function implementation engine to implement the form control functions for specific forms, and a form control function execution engine for the form control operations defined by a form control function.

One or more embodiments present a control function creation interface. The control function creation interface allows for the creation of a form control function independent of any specific form. The control function creation interface generates a reusable form control function based on user input that defines form control operations of the form control function and operation selection logic that determines which of the form control operations to execute. The system stores the reusable form control function with placeholders for (a) the input parameters for the form reusable form control function and (b) the target field(s) to be modified by respective form control operations of the form control function.

One or more embodiments present a control function implementation interface. The control function implementation interface generates form control code for a specific form based on user input that (a) maps the attributes (e.g., form fields, form user, form type) of a particular form to the input parameters of a form control function and (b) maps a particular field of a form, that is to be controlled, to a target of a form control operation defined by the form control function. The system-generated form control code (a) determines the attributes of the particular form, (b) applies the form control function to the attributes of the particular form to select form control operations, and (c) executes the form control operations on the particular field of the form that is to be controlled.

One or more embodiments present a form control execution interface that modifies forms based on the system-generated form control code. The form control execution interface presents a form and modifies the attributes of one or more target fields of the form in accordance with one or more form control functions implemented for the form. The form control execution interface accepts user input including data submitted for completing the form. The system executes the system-generated form control code to select and apply a form control function to the submitted data and/or other attributes associated with the form. At least one of the form control operations, defined by the form control function, modifies an attribute of a form displayed by the form control execution interface.

One or more embodiments described in this Specification and/or recited in the claims may not be included in this General Overview section.

2. Form Control System 2.1. System Components

FIG. 1 illustrates an example of a form control system 100 in accordance with one or more embodiments, as illustrated in FIG. 1, the system 100 includes data repository 102, form control function generator 114, form control function implementation engine 118, and form control function execution engine 122. data repository 102 is configured to store one or more form control function definitions 112, each of which may indicate one or more form control function input parameters 106, form control operations 104, operation selection logic 110, and/or form control function targets 108. data repository 102 is further configured to store form implementation definition 109. form control function generator 114 may be configured to generate control function creation interface 116. form control function implementation engine 118 may be configured to generate control function implementation interface 120. form control function execution engine 122 may be configured to generate form control execution interface 124. each of these components is described in further detail below.

In an embodiment, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In an embodiment, form control function generator 114 refers to hardware and/or software configured to perform operations for generating a form control function, examples of which are described below with respect to FIG. 2A. In an embodiment, generating a form control function uses a control function creation interface 116. Control function creation interface 116 is configured to present user interface controls and receive user input applicable to a particular form control function. Interfaces generally, and an example of a control function creation interface more specifically, are described in further detail below.

In an embodiment, generating a form control function generates a form control function definition 112. Form control function definition 112 includes various components that define how a form control function operates. Specifically, a form control function definition 112 may indicate one or more form control function input parameters 106, form control operations 104, operation selection logic 110, and/or form control function targets 108. Form control function definition 112 is a module, in the sense that it is defined without being linked to any specific form implementation and can be reused across multiple form-specific implementations.

Form control function definition 112 may indicate one or more form control operations 104. A form control operation 104 corresponds to a particular operation to be executed as part of the form control function. A form control operation 104 may include, for example: hiding a form field; showing a form field; populating data in a form field; submitting a form; highlighting a form field; deactivating a form field; changing a label; etc.

Form control function definition 112 may indicate one or more form control function input parameters 106. A form control function input parameter 106 is a parameter that is supplied as input to a form control function and evaluated to determine whether and/or how to execute a form control operation 104. A form control function input parameter 106 may include, for example: the type of form being used; an identity of a user of the form; a value of user input supplied to a form field; etc. A form control function input parameter 106 may be a parameter that is visible to a user of the form (e.g., a form field, text on the page, etc.) or a parameter that is not visible to a user of the form (e.g., user agent, date/time, metadata stored in the source code of the page that displays the form, etc.). In general, a form control function input parameter 106 may be any parameter that is programmatically accessible at runtime. As stored in form control function definition 112, a form control function parameter 106 does not correspond to a parameter in any particular form; rather, it is a placeholder that can be mapped to a parameter in a particular form when implementing an instance of the form control function as described herein.

Form control function definition 112 may indicate one or more form control function targets 108. A form control function target 108 is a form component to be controlled by the form control function. For example, a form control function target 108 may correspond to a particular form field, text label, etc. As stored in form control function definition 112, a form control function target 108 does not correspond to a target in any particular form; rather, it is a placeholder that can be mapped to a target in a particular form when implementing an instance of the form control function as described herein.

Form control function definition 112 may indicate operation selection logic 110. Operation selection logic 110 is logic that evaluates the value(s) of one or more form control function input parameters 106 and, based on the value(s), selects which form control operation(s) 104 to perform on one or more form control function targets 108. For example, based on the value of user input to a form field, the operation selection logic 110 may indicate that another form field should be hidden and/or disabled. In general, operation selection logic 110 may include one or more logic operators that connect a form control function input parameter 106 to the corresponding form control operation(s) 104, such as if/then/else, a "while" loop, an "until" loop, etc. At the time the form control function definition 112 is created, the form control function input parameters 106 and form control function targets 108 have not yet been mapped to form-specific attributes or fields; accordingly, the operation selection logic 110 stored in the form control function definition 112 indicates relationships between the unmapped placeholders.

In an embodiment, form control function implementation engine 118 refers to hardware and/or software configured to perform operations for implementing previously defined form control functions for a specific form, examples of which are described below with respect to FIG. 2B. In general, form control function implementation engine 118 is configured to map one or more form control function input parameters 106 to one or more specific parameters in a particular form, and one or more form control function targets 108 to one or more specific targets in a particular form. In an embodiment, implementing previously defined form control operations uses a control function implementation interface 120. Control function implementation interface 120 is configured to present user interface controls and receive user input to perform the mappings. Form control function implementation engine 118 is configured to generate code that implements the form control operation(s) for the specific form, without requiring a user to write the code manually for each specific form instance. Interfaces generally, and an example of a control function implementation interface more specifically, are described in further detail below.

In an embodiment, form control implementation engine 118 is configured to generate form implementation definition 109. Form implementation definition 109 stores data that describes a particular form-specific implementation of a form control function. For example, form implementation definition 109 may include data that describes the mappings of form control function input parameters 106 to one or more specific parameters in a particular form, and/or form control function targets 108 to one or more specific targets in a particular form. Alternatively or additionally, form implementation definition 109 may include code, generated by form control function implementation engine 118, corresponding to the form-specific implementation (e.g., HTML, JavaScript, and/or other code that, when loaded and executed, performs the form-specific function as implemented for the specific form).

In an embodiment, form control function execution engine 122 refers to hardware and/or software configured to perform operations for executing a form control function, examples of which are described below with respect to FIG. 2C. To execute a form control function, form control function execution engine 122 may be configured to load form implementation definition 109. In an embodiment, executing a form control function uses a form control execution interface 124. Form control execution interface 124 is configured to present a form including one or more user interface controls, receive user input to one or more of the controls, and execute the form control code generated by form control function implementation engine 118 for that specific form. Interfaces generally, and an example of a form control execution interface more specifically, are described in further detail below.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.2. Data Storage

In an embodiment, a data repository 102 is any type of storage unit and/or device (e.g., a file system, database, collection of tables, and/or any other storage mechanism) for storing data. As illustrated in FIG. 1 the data repository 102 may be configured to store one or more form control function definitions 112, each of which may include form control function input parameters 106, form control operations 104, operation selection logic 110, and/or form control function targets 108. Data repository 102 may be further configured to store one or more form implementation definitions 109. Each of these components is described in further detail herein.

The data repository 102 may include multiple different storage units and/or devices. The multiple different storage units and/or devices may or may not be of the same type or located at the same physical site. The data repository 102 may be implemented or executed on the same computing system as one or more other components of the system 100 and/or on a computing system separate from one or more other components of the system 100. The data repository 102 may be communicatively coupled to one or more other components of the system 100 via a direct connection or via a network. Information describing some or all of a form control function definition 112 may be implemented across any of the components of the system 100. However, this information is illustrated within the data repository 102 for purposes of clarity and explanation.

2.3. User Interface

One or more embodiments include user interfaces as described herein. In general, in an embodiment, a user interface refers to hardware and/or software configured to facilitate communications between a user and one or more components of the system 100. A user interface renders user interface elements and receives input via user interface elements. Examples of user interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of a user interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, a user interface is specified in one or more other languages, such as Java, Python, C, or C++.

2.4. Tenants

In an embodiment, a tenant (not shown in FIG. 1) is a corporation, organization, enterprise, or other entity that accesses a shared computing resource, such as the form control system 100. The system 100 may include multiple tenants that are independent from each other, such that a business or operation of one tenant is separate from a business or operation of another tenant.

3. Generating a Form Control Function

Figure 2A:
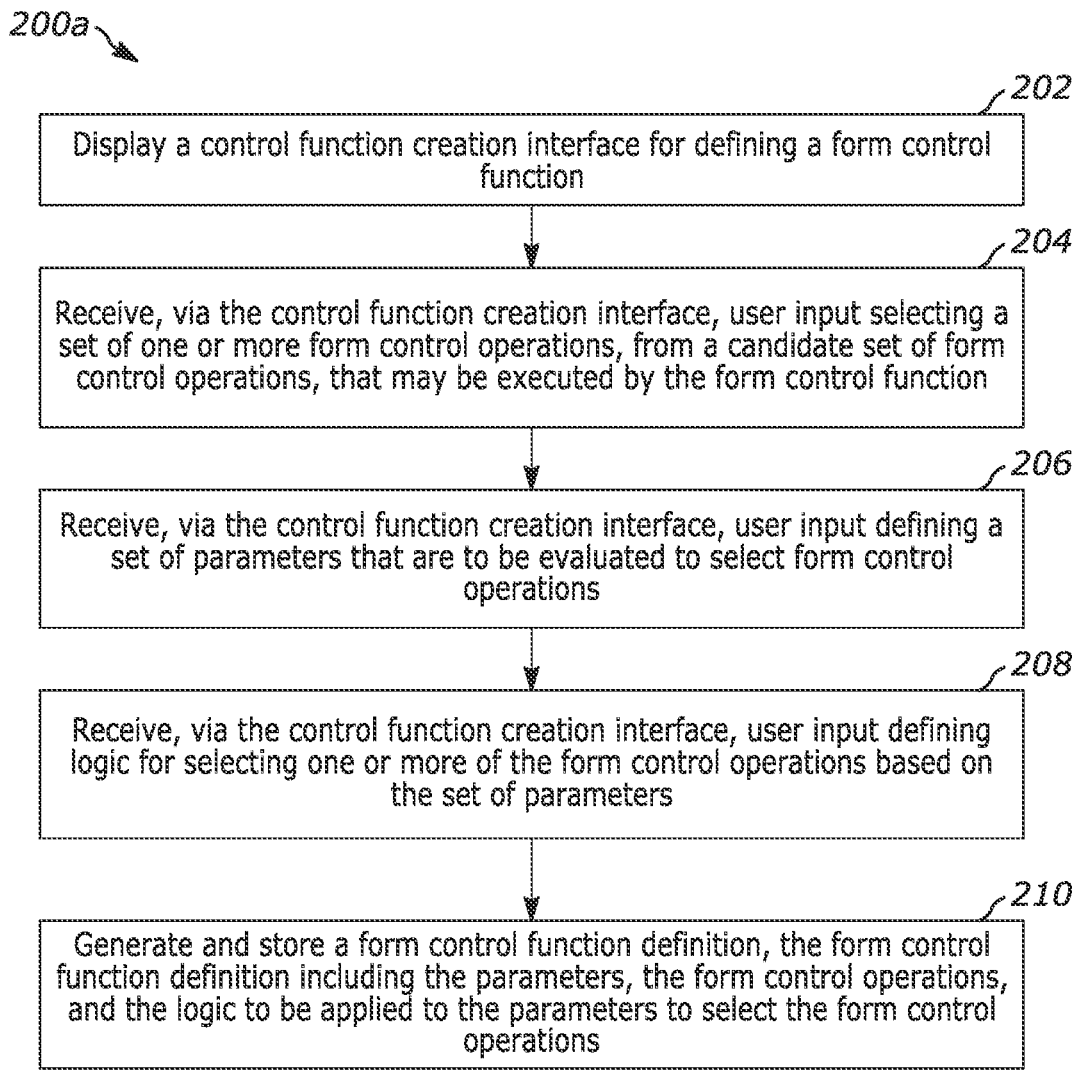
FIG. 2A illustrates operations for generating a form control function in accordance with one or more embodiments.
Figure 2B:
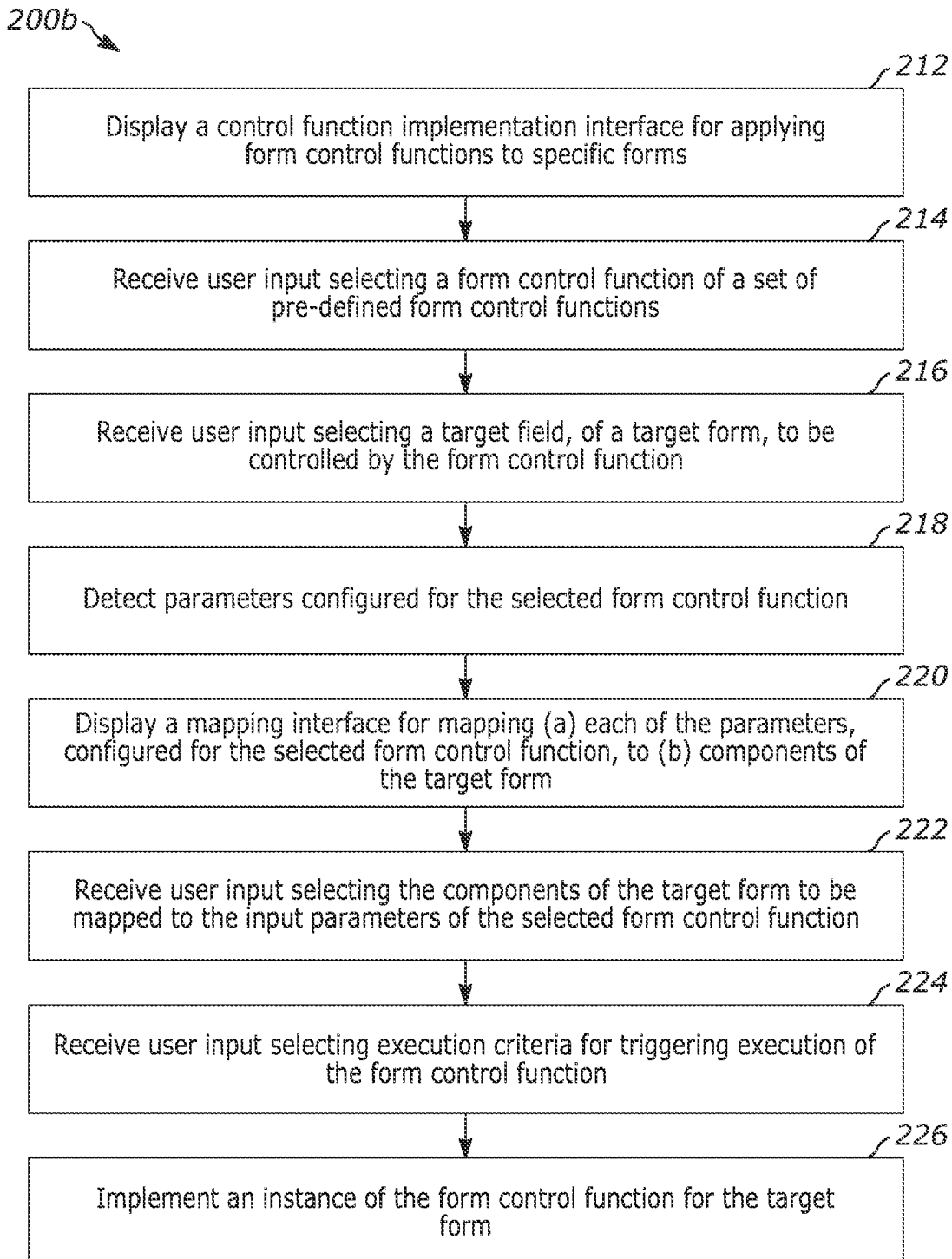
FIG. 2B illustrates operations for implementing previously defined form control operations for a specific form in accordance with one or more embodiments.

FIG. 2A illustrates operations for generating a form control function in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments. One or more operations illustrated in FIG. 2A are performed by a form control function generator (referred to below as a "generator" for ease of discussion), such as that illustrated in FIG. 1.

In an embodiment, the generator displays a form control function creation interface for defining a form control function (Operation 202). The interface includes a candidate set of form control operations that may be executed by the form control function. The interface presents the candidate set of form control operations along with one or more interface controls that allow(s) a user to select one or more of the candidate operations for creating a form control function. An example of a form control function creation interface is described in further detail below.

In an embodiment, the generator receives, via the interface, user input that selects a set of one or form control operations from the candidate set of form control operations (Operation 204). Specifically, the generator detects user input that indicates a user interaction with one or more interface controls. The generator determines that the user input corresponds to a selection of one or more form control operations from the candidate set.

In an embodiment, the generator receives, via the interface, user input that defines a set of parameters to be evaluated to select form control operations (Operation 206). These parameters do not correspond to specific parameters in any particular form. Rather, they are placeholders to be mapped to specific parameters in a particular form when implementing a specific instance of a form control function, as described below.

In an embodiment, the generator receives, via the interface, user input that defines logic for selecting one or more of the form control operations based on the set of parameters (Operation 208). As noted above, the parameters indicated by a form control function definition are placeholders. The operation selection logic indicates, for one or more particular values of a parameter, which form control operation(s) to perform. When implementing a specific instance of a form control function, a placeholder parameter is mapped to a specific parameter in a specific form. Thus, in a form-specific implementation, the operation(s) become(s) conditioned on the value(s) of the form-specific parameters.

In an embodiment, the generator generates and stores a form control function definition (Operation 210). The definition includes the parameters, form control operations, and logic to be applied to the parameters to select the form control operations. A form control function definition does not, by itself, define a specific form. Rather, a form control function definition is a reusable definition that allows for the form control function to be implemented for multiple specific forms without requiring the function to be reprogrammed in each instance.

4. Implementing a Previously Created Form Control Function for a Particular Form FIG. 2B illustrates operations for implementing previously defined form control operations for a specific form in accordance with one or more embodiments. One or more operations illustrated in FIG. 2B may be modified, rearranged, or omitted all together. Accordingly, the particular sequence of operations illustrated in FIG. 2B should not be construed as limiting the scope of one or more embodiments. One or more operations illustrated in FIG. 2B are performed by a form control implementation engine (referred to below as an "implementation engine" for ease of discussion), such as that illustrated in FIG. 1.

In an embodiment, the implementation engine displays a form control implementation interface for applying form control functions to specific forms (Operation 212). The interface includes a set of predefined form control functions (for example, in a list, dropdown, and/or other format suitable for presenting multiple options), along with one or more user interface controls for selecting a particular form control function from those available. An example of a form control implementation interface is described in further detail below.

In an embodiment, the implementation engine receives, via the interface, user input that selects a form control function, from the set of predefined form control functions (Operation 214). Specifically, the implementation engine detects user input that indicates a user interaction with one or more interface controls. The implementation engine determines that the user input corresponds to a selection of a predefined form control function from the set of predefined form control functions.

In an embodiment, the implementation engine receives, via the interface, user input that selects a target field, of a target form, to be controlled by the form control function (Operation 216). The interface may present user interface controls corresponding to target fields that are available to control (for example in a list, dropdown, and/or other format suitable for presenting multiple options). The implementation engine detects user input that indicates a user interaction with one or more of the user interface controls. The implementation engine determines that the user input corresponds to a selection of a particular target field from the set of available target fields.

In an embodiment, the implementation engine detects parameters configured for the selected form control function (Operation 218). To detect the parameters, the implementation engine may reference a form control function definition that indicates which input parameter(s) is/are configured for the selected form control function. As discussed above, the defined parameters are placeholders that have not yet been mapped to form-specific parameters as discussed below.

In an embodiment, the implementation engine displays a mapping interface for mapping (a) each of the placeholder parameters, configured for the selected form control function, to (b) components of the target form (Operation 220). Specifically, the interface may present user interface controls that describe (a) the parameter(s) included in the form control function definition and (b) components of the target form that are available to be mapped to those parameters, in a manner that allows a user to select mapping relationships between the two.

In an embodiment, the implementation engine receives, via the interface, user input that selects the components of the target form to be mapped to the input parameters of the selected form control function (Operation 222). Specifically, the implementation engine detects user input that indicates a user interaction with one or more of the user interface controls. The implementation engine determines that the user input indicates a desired mapping. In an embodiment, a form control operation is configured to generate output, such as popup dialogue, error message, inline text, etc. The implementation engine may be configured to receive user input that indicates one or more values to be output when the form control operation is performed.

In an embodiment, the implementation engine receives, via the interface, user input that selects execution criteria for triggering execution of the form control function (Operation 224). The execution criteria do not define the form control function itself, but rather the condition(s) under which the form control function is to be executed. For example, the criteria may indicate that the form control function should be executed before or after a specific event, such as when a user interacts with a specific form element, chooses a specific key on a keyboard, when a user resizes or closes a browser window, when a web page containing the form finishes loading, when a form is submitted, when a multimedia item is played, when an error occurs, etc. Alternatively or additionally, the execution criteria may indicate whether the form control function is permitted to execute synchronously with one or more other functions, whether to hide any errors that may arise when the form control function executes, whether a user is permitted to cancel execution of the form control function, etc. The execution criteria do not affect the specifics of the form control function itself, but rather how the form control function executes in the context of the overall user experience.

In an embodiment, the implementation engine implements an instance of the form control function for the target form (Operation 226). In an embodiment, implementing an instance of the form control function generates code that executes the form control function as applied to the specific form, based on the user-defined mappings and execution criteria (if any). The generated code may correspond to an entire page (e.g., a web page or application interface) that includes the target form along with the form control function (e.g., as JavaScript and/or another kind of scripting language). Alternatively, the generated code may correspond to a code block that can be inserted into a page. In an embodiment, the implementation engine generates the code without requiring the user to implement the code on a form-by-form basis. The same form control function may be applied to multiple target forms, resulting in different form-specific functionality despite being implemented based on the same form control function definition. In an embodiment, the implementation engine stores an form implementation definition that describes the form-specific implementation of the form control function (not shown in FIG. 2B). Thus, the definition can be retrieved from storage for subsequent execution.

5. Executing the Form Control Function for the Particular Form

Figure 2C:
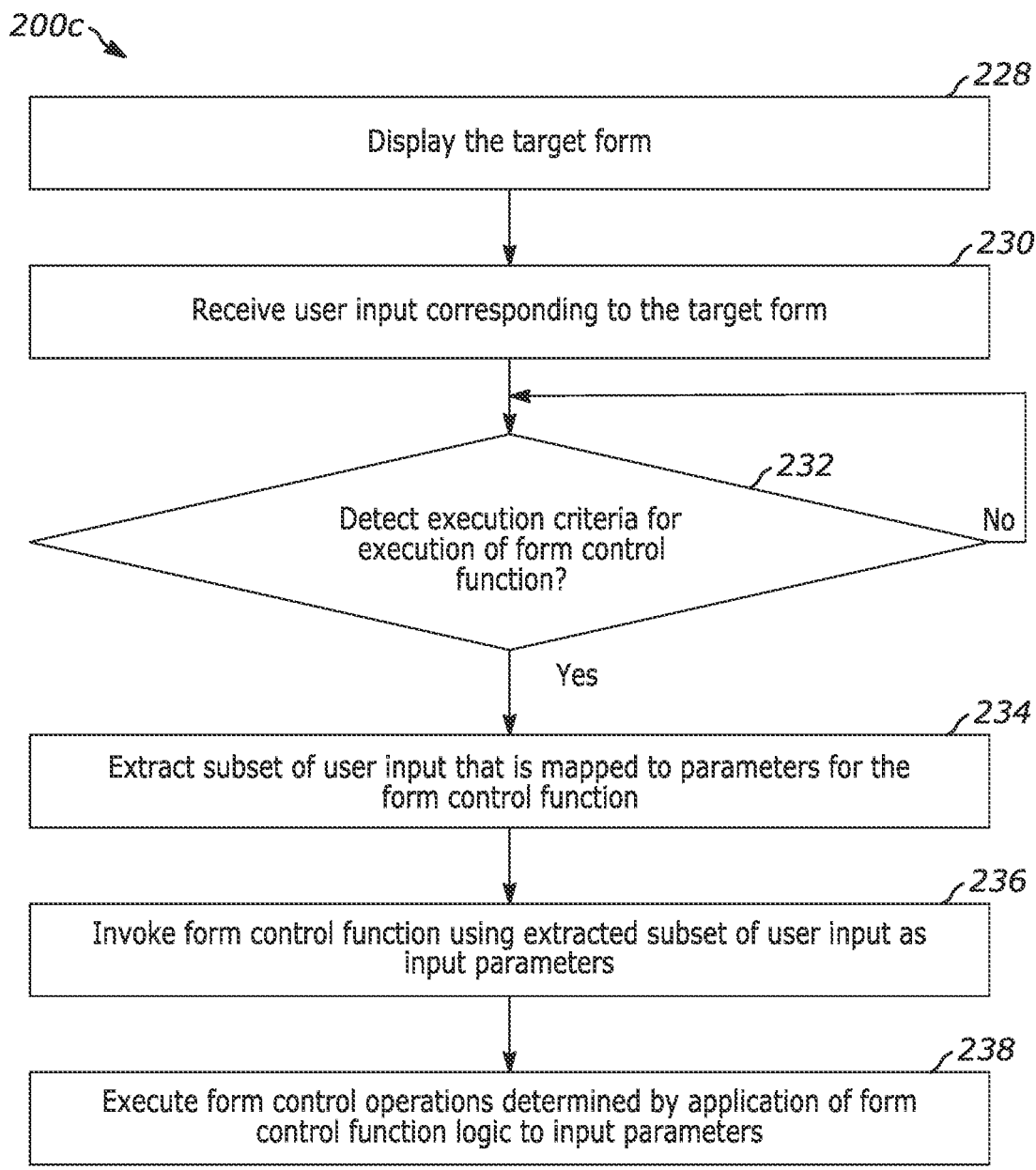
FIG. 2C illustrates operations for executing a form control function in accordance with one or more embodiments.

FIG. 2C illustrates operations for executing a form control function in accordance with one or more embodiments. One or more operations illustrated in FIG. 2C may be modified, rearranged, or omitted all together. Accordingly, the particular sequence of operations illustrated in FIG. 2C should not be construed as limiting the scope of one or more embodiments. One or more operations illustrated in FIG. 2C are performed by a form control function execution engine (referred to below as an "execution engine" for ease of discussion), such as that illustrated in FIG. 1.

In an embodiment, the execution engine displays the target form (Operation 228). To display the target form, the execution engine renders the form fields according to the form-specific implementation of a form control function. Specifically, the form fields are linked to one or more form control functions according to the form-specific implementation. For example, the execution engine may display the target form in a web page or application interface. The execution engine may load an form implementation definition from storage and display the target form according to the form implementation definition.

In an embodiment, the execution engine receives user input corresponding to the target form (Operation 230). Specifically, the execution engine detects user input that indicates a user interaction with one or more of the user interface controls of the target form.

In an embodiment, the execution engine determines whether one or more execution criteria, for execution of the form control function, is/are detected (Operation 232). For example, depending on the execution criteria, the execution engine may monitor for the occurrence of a specific event, such as when a user interacts with a specific form element, chooses a specific key on a keyboard, when a user resizes or closes a browser window, when a web page containing the form finishes loading, when a form is submitted, when a multimedia item is played, when an error occurs, etc. If the criteria is/are not detected, then the execution engine continues to monitor for the criteria. If the criteria is/are detected (or if no such criteria are defined), then the execution engine proceeds with executing the form control function as described below.

In an embodiment, the execution engine extracts a subset of user input that is mapped to parameters for the form control function (Operation 234). Specifically, the execution engine detects user input that indicates a user interaction with one or more of the user interface controls of the target form that is/are mapped to parameters for the form control function. Alternatively or additionally, as noted above, one or more of the form control function parameters may be mapped to data that does not depend on user input (e.g., user identity, user agent string, etc.).

In an embodiment, the execution engine invokes the form control function, using the extracted subset of user input (and/or non-input data) as input parameters (Operation 236). The execution engine executes form control operations, determined by application of form control function logic to the input parameters (Operation 238). For example, the execution engine may detect user input to a particular form field. Based on the value(s) of the user input, the execution engine executes a corresponding form control operation as defined by the form control function logic.

6. Control Function Creation Interface

Figure 3:
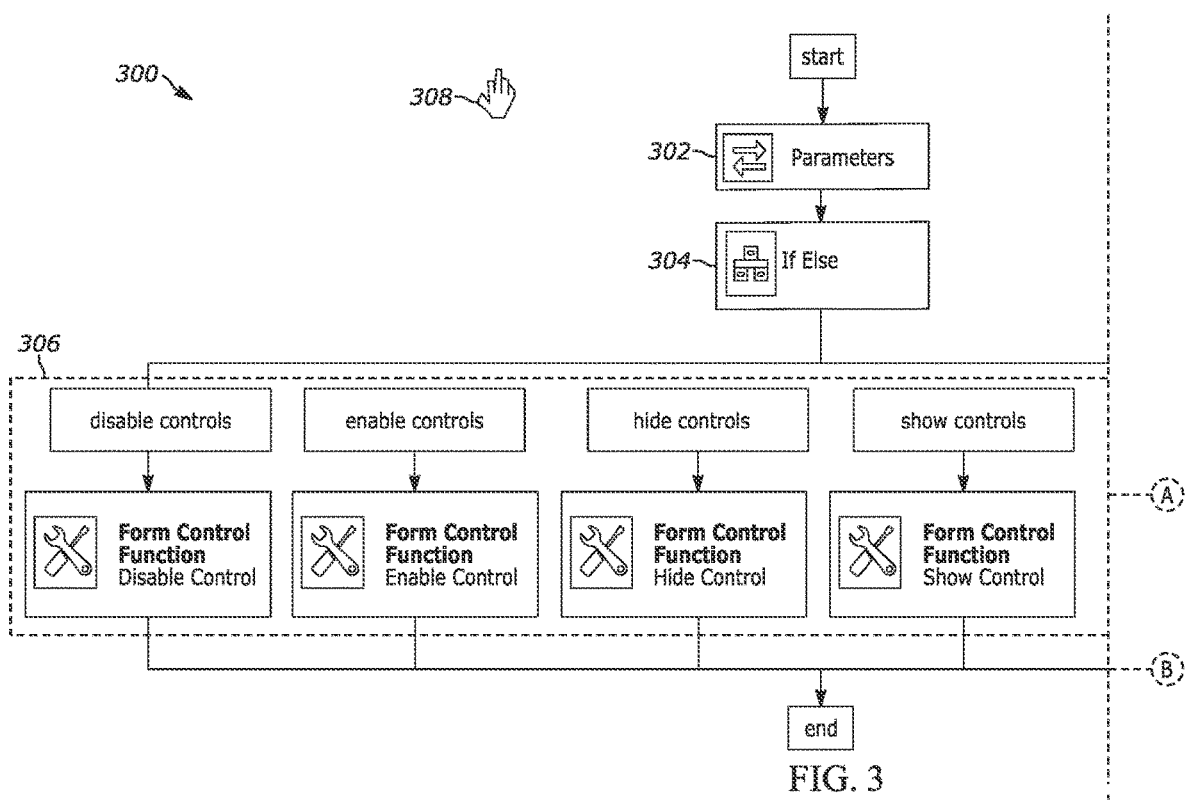
FIG. 3 illustrates a control function creation interface in accordance with one or more embodiments.
Figure 3:
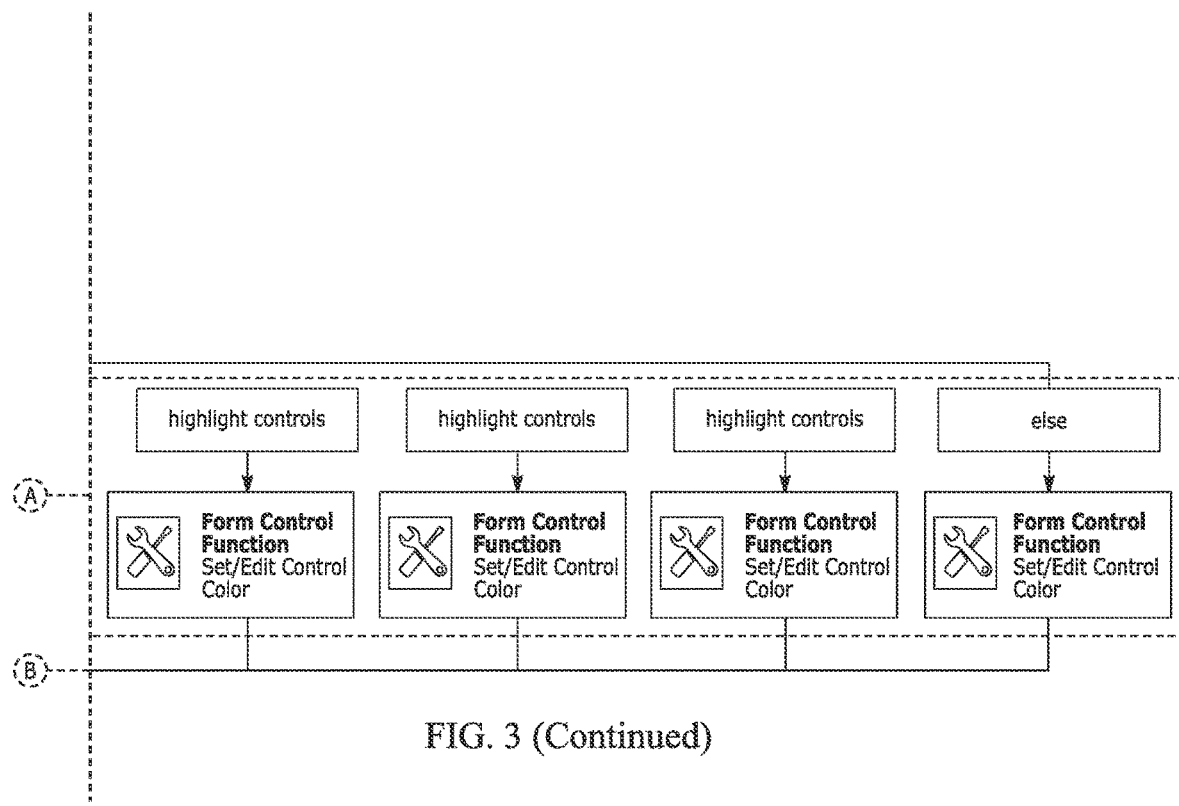

FIG. 3 illustrates a control function creation interface in accordance with one or more embodiments. Components and/or operations described below should be understood as one specific example which may not be applicable to certain embodiments. Accordingly, components and/or operations described below should not be construed as limiting the scope of any of the claims.

Specifically, the control function creation interface illustrated in FIG. 3 is configured to allow a user to specify the components of a single form control function definition 300. Operation selection logic 304 determines which function control operations 306 to perform based on the values of input parameters 302. As discussed above, the input parameters 302 are placeholders; they are not mapped to any form-specific parameters. In the example illustrated in FIG. 3, there are eight form control operations 306 that may be executed depending on the values of the input parameters 302. "Highlight controls" appears three times in this example because there are three different parameter values (which may be for the same parameter 302 or different parameters 302) that, according to the operation selection logic 304, result in highlighting a control in the target form (which may be the same control or different controls in each instance of the highlight controls operation). FIG. 3 does not show details of the specific parameters 302, operation selection logic 304, and function control operations 306. However, a user may supply user input (e.g., using a cursor 308) to select specific components and cause the control function creation interface to display such details (e.g., in a pop-up window, iFrame, a separate screen, or some other extension of the interface). These details are configurable, so that a user may supply user input to add, remove, or modify parameters 302, operation selection logic 304, and/or function control operations 306. Thus, the control function creation interface illustrated in FIG. 3 provides an intuitive interface for defining reusable form control functions.

7. Control Function Implementation Interface

FIGS. 4A-4D illustrate a control function implementation interface 400 in accordance with one or more embodiments. Components and/or operations described below should be understood as one specific example which may not be applicable to certain embodiments. Accordingly, components and/or operations described below should not be construed as limiting the scope of any of the claims.

Figure 4A:
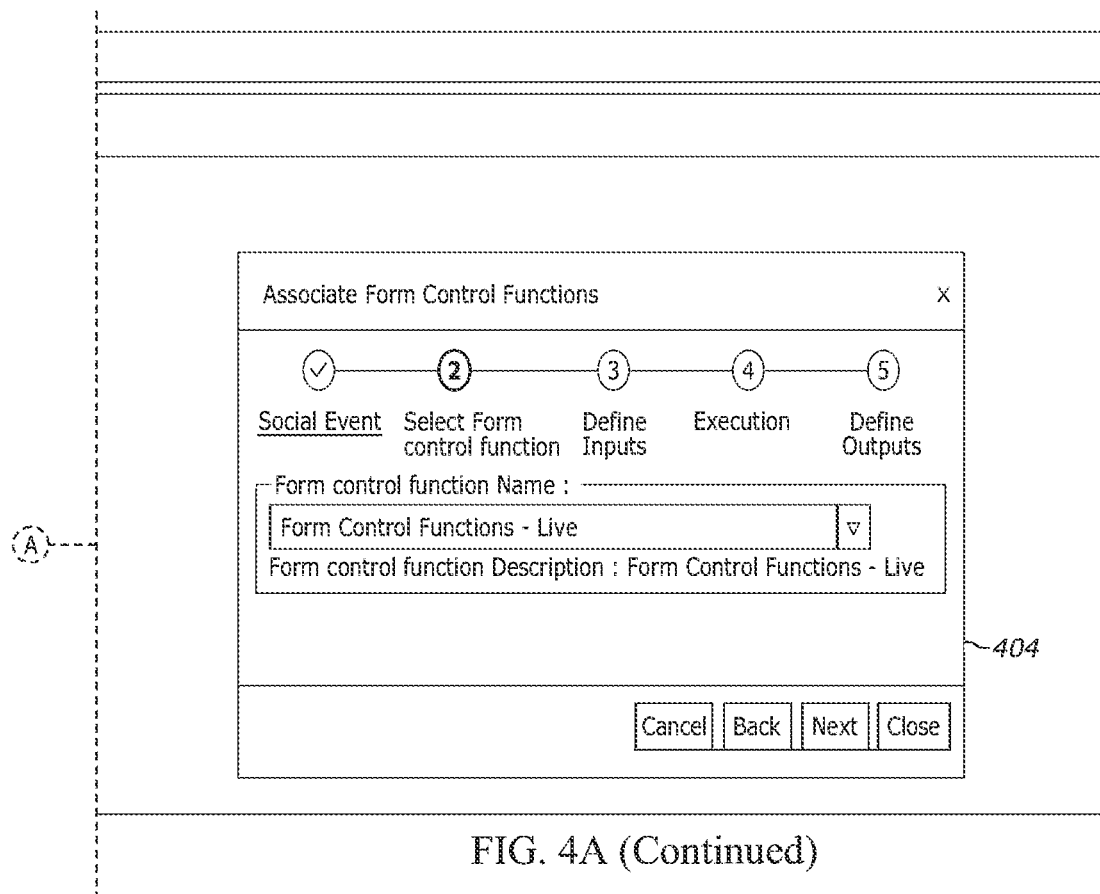

Specifically, starting with FIG. 4A, the interface 400 is used to implement a form control function for a specific form 402. Sub-interface 404 is configured to present a set of available form control functions (e.g., based on a set of form control function definitions stored in the system). Sub-interface 404 is further configured to receive user input to select a particular form control function to implement for the specific form 402.

Figure 4B:
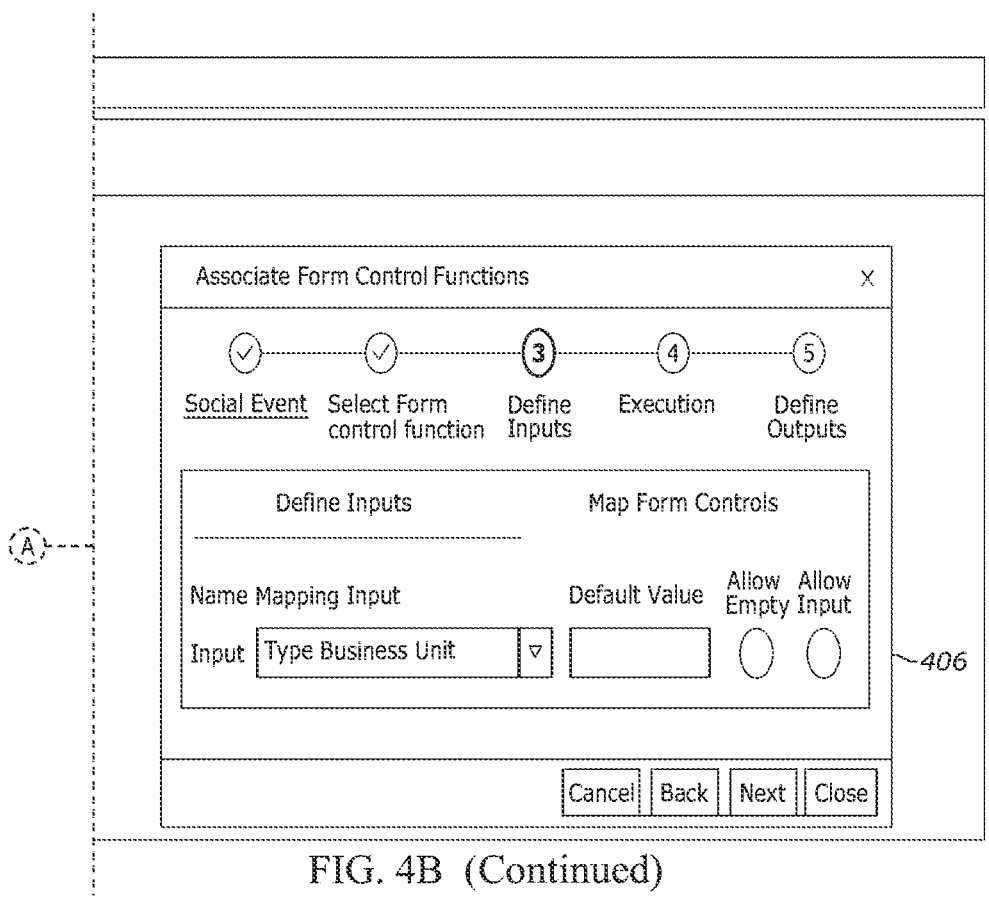
Figure 4C:
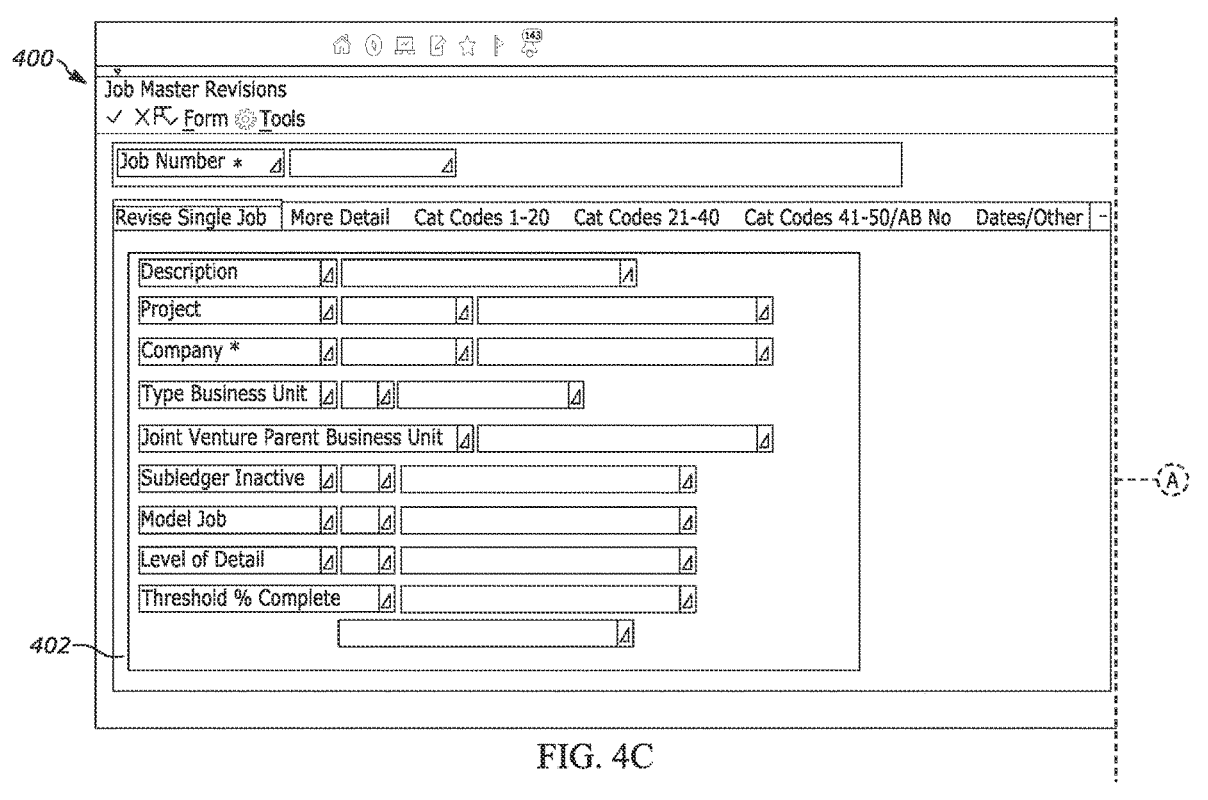
Figure 4C:
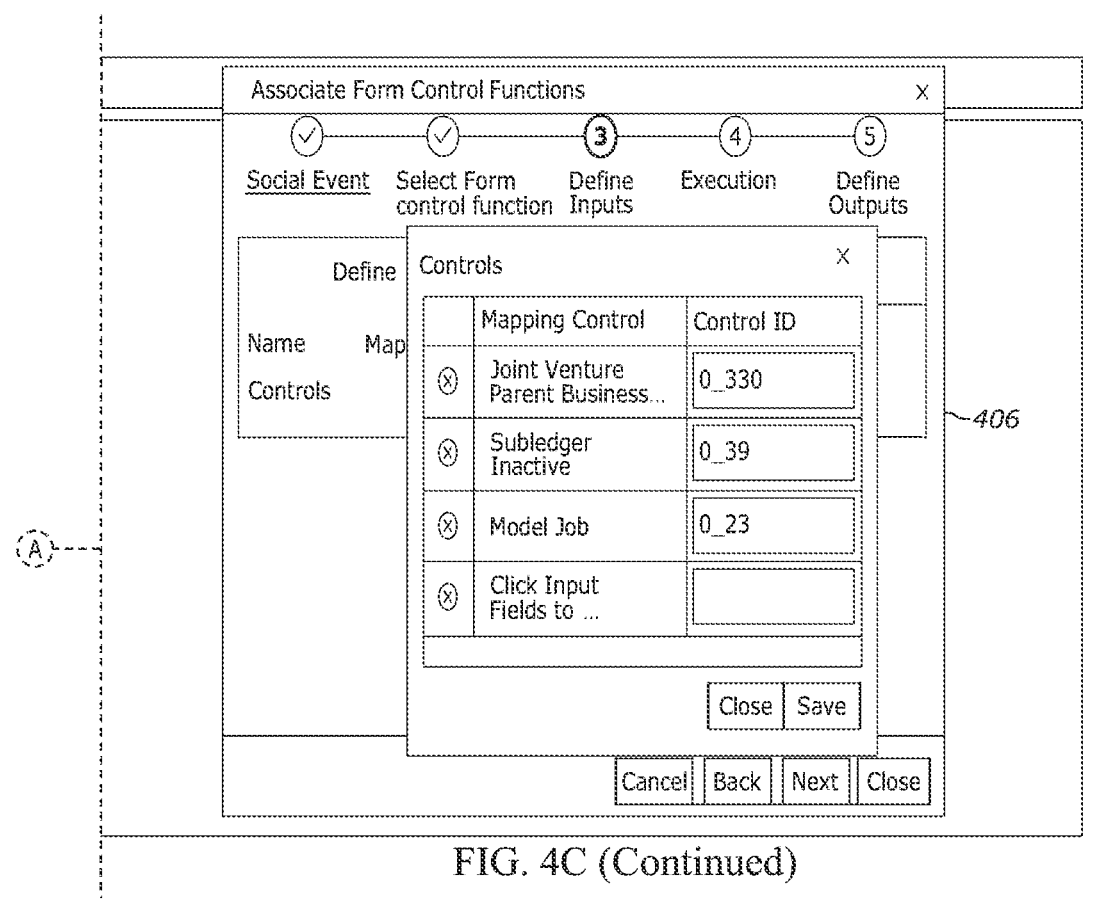

In FIG. 4B, responsive to a user selection of a particular form control function, the interface 400 presents another sub-interface 406 for mapping placeholder parameters to specific form fields. In FIG. 4C, three separate placeholder parameters (labeled as 0_330, 0_39, and 0_23) are mapped to corresponding form fields. When code for this implementation is generated, references to the placeholder parameters are replaced with references to the respective form fields selected. A similar interface (not shown) may be used to map placeholder targets to specific target form fields in the form 402.

Figure 4D:
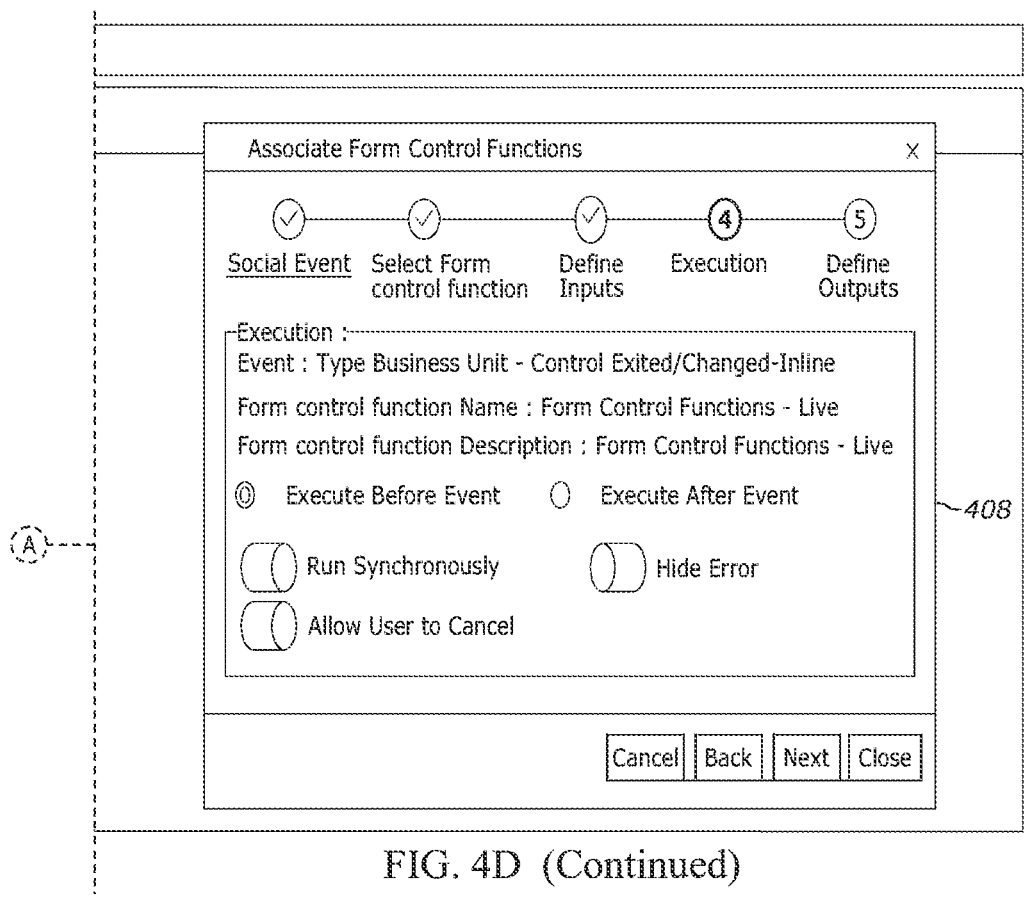

In FIG. 4D, another sub-interface 408 is configured to receive user input to optionally select one or more execution criteria applicable to this form-specific implementation. Based on the user input to the interface 400, the system generates code that implements the form control function for the specific form 402.

8. Form Control Execution Interface

FIGS. 5A-5B illustrate a control function execution interface 500 in accordance with one or more embodiments. Components and/or operations described below should be understood as one specific example which may not be applicable to certain embodiments. Accordingly, components and/or operations described below should not be construed as limiting the scope of any of the claims.

Specifically, the control function execution interface 500 renders a form 508 with one or more underlying form control functions implemented as described above. In this example, a form control function is configured to enable or disable to company field 504 depending on the value of the Business Unit field 506. In this example, in FIG. 5A, a user inputs "JB" into the Business Unit field 506. In FIG. 5B, responsive to the value of the user input not corresponding to a valid business unit, the form control function causes the Company field to be disabled and generates an error message indicating that the business unit is invalid. FIG. 5B further illustrates how form control functions may be used to enforce requirements for form fields, such as a requirement that no fields be left blank.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
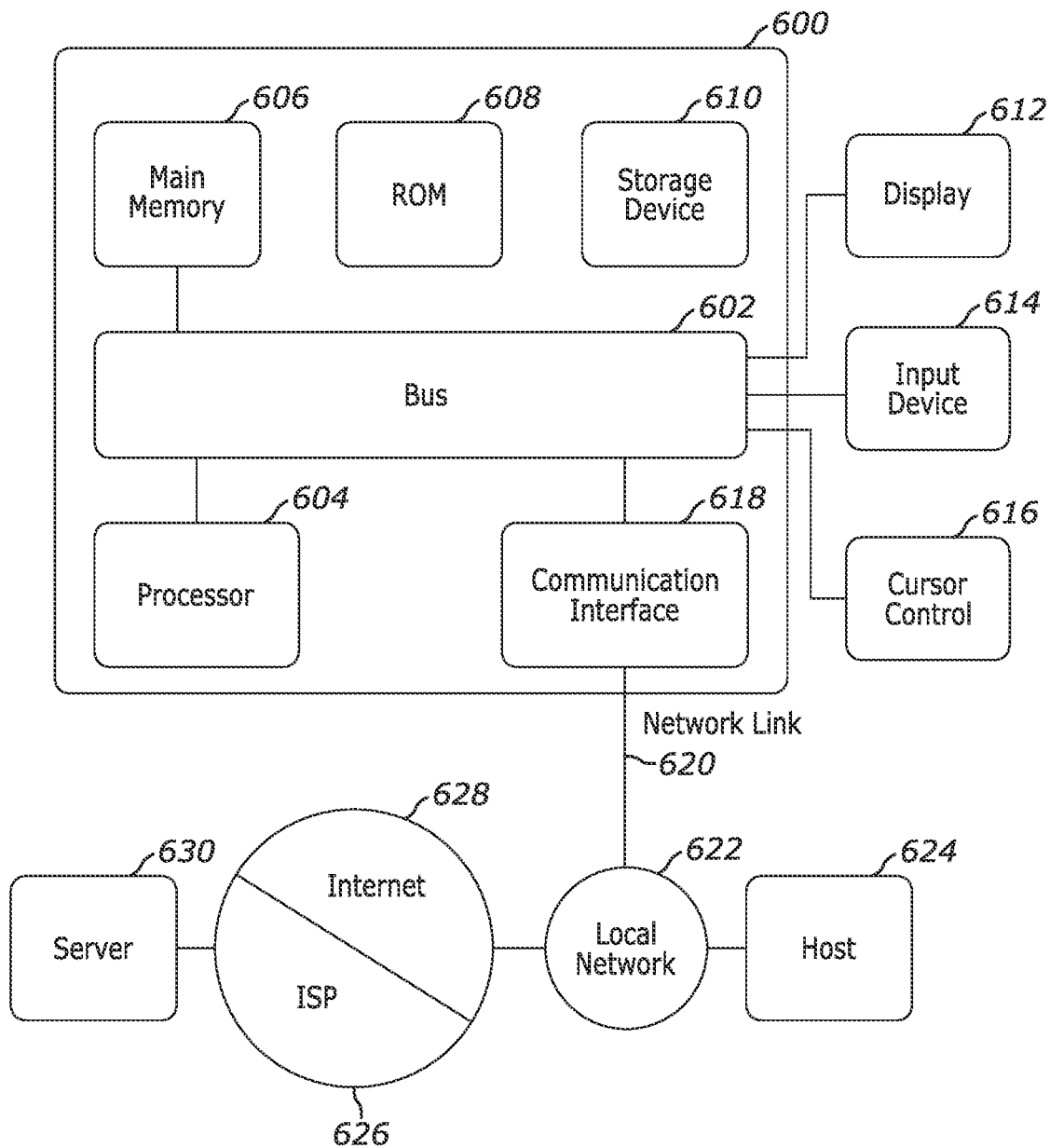
FIG. 6 illustrates a block diagram of a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 640 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    displaying a form control implementation interface for applying form control functions to forms, each particular form control function of the form control functions being configured to execute at least one form control operation of a corresponding set of one or more form control operations defined by the particular form control function, wherein the form control functions are defined prior to displaying the form control implementation interface;
    receiving via the form control implementation interface;
    a first user input selecting a form control function of the form control functions;
    a second user input selecting one or more input parameters, for the form control function, that are associated with a target form;
    a third user input selecting a target field of the target form, one or more attributes of the target field to be modified via execution of the form control function;
    based at least on the first user input, the second user input, the third user input and a form control function definition that corresponds to the form control function;
    generating form control code that (a) determines the one or more input parameters associated with the target form and (b) applies the form control function to the one or more input parameters to cause execution of at least one form control operation of a first set of one or more form control operations defined by the form control function, to modify the one or more attributes of the target field.

2. The medium of claim 1, wherein the operations further comprise:
    receiving, via the form control implementation interface, execution criteria identifying one or more conditions for execution of the form control function,
    wherein the form control code applies the form control function to the one or more input parameters in response to detecting the one or more conditions.

3. The medium of claim 1, wherein the operations further comprise:
    prior to displaying the form control implementation interface;
    displaying a form control creation interface for defining form control functions;

receiving a fourth user input selecting the first set of one or more form control operations for defining the form control function;

receiving a fifth user input defining operation selection logic that selects at least one of the first set of one or more form control operations based on the one or more input parameters;

generating the form control function definition based at least on the fourth user input and the fifth user input.

4. The medium of claim 3, wherein the operation selection logic selects a first form control operation when the one or more input parameters meet a particular criteria and selects a second form control operation when the one or more input parameters do not meet the particular criteria.

5. The medium of claim 1, wherein the operations further comprise:

subsequent to generating the form control code;

displaying an instance of the target form;

receiving form data in relation to one or more fields of the target form;

detecting an execution criteria for execution of the form control function;

responsive to detecting the execution criteria;

invoking the form control function using at least a portion of the form data, wherein invoking the form control function results in execution of a particular form control operation of the first set of form control operations.

6. The medium of claim 5, wherein invoking the form control function modifies attributes of two or more target fields in the target form.

7. The medium of claim 1, wherein the operations further comprise:

receiving, via the form control implementation interface, output metadata identifying data to be output upon execution of the form control function, wherein the form control code is configured to identify and output the data based on the output metadata.

8. A method comprising:

displaying a form control implementation interface for applying form control functions to forms, each particular form control function of the form control functions being configured to execute at least one form control operation of a corresponding set of one or more form control operations defined by the particular form control function;

receiving via the form control implementation interface:
a first user input selecting a form control function of the form control functions;
a second user input selecting one or more input parameters, for the form control function, that are to be extracted from the target form;
a third user input selecting a target field of a target form, one or more attributes of the target field to be modified via execution of the form control function;

based at least on the first user input, the second user input, the third user input and a form control function definition that corresponds to the form control function;

generating form control code that (a) extracts the one or more input parameters from form data received for the target form and (b) applies the form control function to the one or more input parameters to cause execution of at least one form control operation of a first set of one or more form control operations defined by the form control function, to modify the one or more attributes of the target field.

9. The method of claim 8, wherein the operations further comprise:

receiving, via the form control implementation interface, execution criteria identifying one or more conditions for execution of the form control function, wherein the form control code applies the form control function to the one or more input parameters in response to detecting the one or more conditions.

10. The method of claim 8, wherein the operations further comprise:

prior to displaying the form control implementation interface;

displaying a form control creation interface for defining form control functions;

receiving a fourth user input selecting the first set of one or more form control operations for defining the form control function;

receiving a fifth user input defining operation selection logic that selects at least one of the first set of one or more form control operations based on the one or more input parameters;

generating the form control function definition based at least on the fourth user input and the fifth user input.

11. The method of claim 10, wherein the operation selection logic selects a first form control operation when the one or more input parameters meet a particular criteria and selects a second form control operation when the one or more input parameters do not meet the particular criteria.

12. The method of claim 8, wherein the operations further comprise:

subsequent to generating the form control code;

displaying an instance of the target form;

receiving form data in relation to one or more fields of the target form;

detecting an execution criteria for execution of the form control function;

responsive to detecting the execution criteria;

invoking the form control function using at least a portion of the form data, wherein invoking the form control function results in execution of a particular form control operation of the first set of form control operations.

13. The method of claim 12, wherein invoking the form control function modifies attributes of two or more target fields in the target form.

14. A system comprising:

at least one device including a hardware processor;

the system being configured to perform operations comprising:

displaying a form control implementation interface for applying form control functions to forms, each particular form control function of the form control functions being configured to execute at least one form control operation of a corresponding set of one or more form control operations defined by the particular form control function;

receiving via the form control implementation interface:
a first user input selecting a form control function of the form control functions;
a second user input selecting one or more input parameters, for the form control function, that are to be extracted from the target form;
a third user input selecting a target field of a target form, one or more attributes of the target field to be modified via execution of the form control function;

based at least on the first user input, the second user input, the third user input and a form control function definition that corresponds to the form control function;

generating form control code that (a) extracts the one or more input parameters from form data received for the target form and (b) applies the form control function to the one or more input parameters to cause execution of at least one form control operation of a first set of one or more form control operations defined by the form control function, to modify the one or more attributes of the target field.

15. The system of claim 14, wherein the operations further comprise:
receiving, via the form control implementation interface, execution criteria identifying one or more conditions for execution of the form control function,
wherein the form control code applies the form control function to the one or more input parameters in response to detecting the one or more conditions.

16. The system of claim 14, wherein the operations further comprise:
prior to displaying the form control implementation interface;
displaying a form control creation interface for defining form control functions;
receiving a fourth user input selecting the first set of one or more form control operations for defining the form control function;
receiving a fifth user input defining operation selection logic that selects at least one of the first set of one or more form control operations based on the one or more input parameters;
generating the form control function definition based at least on the fourth user input and the fifth user input.

17. The system of claim 16, wherein the operation selection logic selects a first form control operation when the one or more input parameters meet a particular criteria and selects a second form control operation when the one or more input parameters do not meet the particular criteria.

18. The system of claim 14, wherein the operations further comprise:
subsequent to generating the form control code;
displaying an instance of the target form;
receiving form data in relation to one or more fields of the target form;
detecting an execution criteria for execution of the form control function;
responsive to detecting the execution criteria;
invoking the form control function using at least a portion of the form data,
wherein invoking the form control function results in execution of a particular form control operation of the first set of form control operations.

19. The system of claim 18, wherein invoking the form control function modifies attributes of two or more target fields in the target form.

20. The system of claim 19, wherein the operations further comprise:
receiving, via the form control implementation interface, output metadata identifying data to be output upon execution of the form control function,
wherein the form control code is configured to identify and output the data based on the output metadata.

* * * * *